United States Patent
Walter et al.

(10) Patent No.: US 8,628,248 B2
(45) Date of Patent: Jan. 14, 2014

(54) CENTRIFUGAL RING WITH COLLECTING CHANNEL

(75) Inventors: Wilheim Walter, Poppenhausen (DE); Erwin Hartmann, Bergrheinfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 253 days.

(21) Appl. No.: 12/972,764

(22) Filed: Dec. 20, 2010

(65) Prior Publication Data

US 2011/0150380 A1  Jun. 23, 2011

(30) Foreign Application Priority Data

Dec. 21, 2009 (DE) .......................... 10 2009 059 842

(51) Int. Cl.
*F16C 33/76* (2006.01)
*F16C 33/80* (2006.01)

(52) U.S. Cl.
USPC ............................ 384/477; 384/480; 384/486

(58) Field of Classification Search
USPC .......... 384/448, 477, 480, 484, 486; 277/353, 277/411, 412, 418, 423, 424, 551, 562
See application file for complete search history.

(56) References Cited

U.S. PATENT DOCUMENTS

2007/0085276 A1*  4/2007  Hartmann et al. ............ 277/349

FOREIGN PATENT DOCUMENTS

| DE | 38 38 824 A1 |   | 5/1990 |
|----|--------------|---|--------|
| JP | 10009402 A   | * | 1/1998 |
| JP | 10009403 A   | * | 1/1998 |
| JP | 11023597 A   | * | 1/1999 |

OTHER PUBLICATIONS

EN Machine translation of JP 11-23597.

* cited by examiner

*Primary Examiner* — Phillip A Johnson
(74) *Attorney, Agent, or Firm* — Lucas & Mercanti, LLP

(57) ABSTRACT

A seal arrangement with a centrifugal ring for a sealing between a rotatable bearing part and a static bearing part. The centrifugal ring has a first end piece, which forms both an outer circumference of the centrifugal ring and a cutoff edge located on a disk-shaped outer face. The seal arrangement reduces the coefficient of friction without having to accept any loss of sealing effect, but in which the seal arrangement nevertheless remains cost-effective to manufacture. For this purpose, the centrifugal ring has a second end piece. The end pieces together form a first collecting channel in the vicinity of the cutoff edge and the end pieces each form an annular seal gap with a static bearing part.

10 Claims, 2 Drawing Sheets

CENTRIFUGAL RING WITH COLLECTING CHANNEL

This application claims the priority of DE 10 2009 059 842.1 filed Dec. 21, 2009 which is incorporated by reference herein.

BACKGROUND OF THE INVENTION

1. Field of the Invention

The invention relates to a centrifugal ring for the sealing between a rotatable bearing part a static bearing part on an axial outside of a rolling bearing, the centrifugal ring comprising a fastener for fastening the centrifugal ring to the rotatable bearing part and extending from the fastener substantially in a radial direction away from the axis of rotation of the centrifugal ring, a disk-shaped outer face of the centrifugal ring being intended to form part of the outside of the rolling bearing and a first end piece of the centrifugal ring forming both an outer circumference of the centrifugal ring and a cutoff edge located on the disk-shaped outer face. The invention further relates to a seal arrangement for rolling bearings, in particular wheel bearings having such a centrifugal ring.

2. Prior Art

Such a centrifugal ring is employed in seal arrangements which are used in radial rolling bearings, for example in wheel bearings for motor vehicles.

A large number of sealing lips, which form a sealing contact in a radial or axial direction, for example, increases the sealing efficiency of a seal arrangement for said rolling bearings, but this at the same time increases the coefficient of friction of the seal arrangement accordingly, so that more force and thereby more energy needs to be expended. Each seal arrangement represents a compromise between a requisite sealing effect and the desired energy consumption, or fuel consumption in the case of motor vehicles.

DE 38 38 824 A1 discloses a seal arrangement in the form of a cassette seal, which is formed from a static sealing ring and a rotatable centrifugal ring. The centrifugal ring comprises a formed sheet-metal part and an elastic part, the elastic part being supported by the formed sheet-metal part. The elastic part furthermore forms a cutoff edge on the disk-shaped outer face of the sealing ring, a radial sealing lip likewise being formed, which is in frictional sealing contact with a carrier plate of the sealing ring.

A cutoff edge on the axial outside of a rolling bearing provides a means of deflecting the radial direction of movement of the splash water from the radially outward directed movement at least partially into an axially directed movement. This serves to ensure that as the water moves away via the apertures of the seal gap between the rotatable bearing part and a static bearing part no water gets into the seal gap, and no dirt particles get into the seal arrangement, and ultimately washed into the roller compartment of the rolling bearing.

An outer seal labyrinth as afforded by a long, angled seal gap is also one way of achieving a contact-free sealing effect, but significantly increases the manufacturing effort involved in forming the sealing ring and cent fugal ring.

OBJECT OF THE INVENTION

Summary of the Invention

The object of the invention is therefore to specify a centrifugal ring or a seal arrangement for rolling bearings, in particular wheel bearings, having a high sealing efficiency, a low coefficient of friction and low manufacturing costs.

The object is achieved by a wheel bearing unit of the type specified in the introduction in that the centrifugal ring comprises a second end piece, the end pieces together forming a first collecting channel and the end pieces each being intended to form an annular seal gap with the static bearing part or another static bearing part. The object is further achieved by a seal arrangement, in particular a cassette seal, which comprises such a centrifugal ring.

For sealing, the centrifugal ring according to the invention is inserted between a rotatable bearing part and a static bearing part, these bearing parts being arranged concentrically in relation to one another, that is to say having the same axis of rotation. In the operating state of the rolling bearing dirt particles and moisture are present on an axial outside of a rolling bearing, which may be formed at least in part by the rotatable bearing part and the static bearing part, since this is an area which is unsealed or not fully sealed and exposed to environmental influences.

The centrifugal ring comprises a fastener for fastening the centrifugal ring to the rotatable bearing part. From the fastener the centrifugal ring extends substantially in a radial direction away from the axis of rotation of the centrifugal ring. This involves one or more radial parts of the centrifugal ring, which may be slightly axially offset in relation to one another, or the centrifugal ring on one or the other radial part may comprise a signal transmitter for a rotational speed sensor (for antilock brake systems, for example), in particular an encoder. Despite these axial enlargements, the centrifugal ring, apart from the fastener, which is generally of hollow cylindrical design, is substantially disk-shaped.

For this purpose, a disk-shaped outer face of the centrifugal ring is intended to form at least part of the outside of the rolling bearing. The centrifugal ring thereby assumes a sealing function, which in particular keeps splash water or dirt particles away from the seal arrangement. It is advantageous for this purpose that the disk-shaped outer face of the centrifugal ring be arranged in the same radial plane as the axial outsides of the rotatable and static bearing parts.

The rotatable bearing part may be a wheel hub, an inner ring or another rotatable bearing ring, which rotates together with the wheel hub.

The static bearing part may be a bearing ring, such as a static outer ring, for example, which can be fastened in a wheel carrier. Alternatively the static bearing part may also be a sealing ring of the seal arrangement, which is intended to enclose the centrifugal ring at least partially. One particular embodiment might be a cassette seal, for example, a distinguishing feature of which is its particular leaktightness.

In addition, there is provision for a first end piece of the centrifugal ring to form both an outer circumference of the centrifugal ring and also a cutoff edge located on the disk-shaped outer face. The first end piece is preferably oriented towards an outer edge of the static bearing part and together with the latter forms an annular seal gap. The first end piece thereby ensures that an inner face of the cutoff edge and the outer face of the first end piece include a small angle, so that the water impelled over the cutoff edge produces an efficient suction effect, which in front of the orifice of the seal gap between the first end piece and the stationary bearing parts gives rise to a partial vacuum, which sucks splash water that has already penetrated out of the seal arrangement.

In addition, the centrifugal ring comprises a second end piece, the first end piece and the second end piece together forming a first collecting channel. This collecting channel is advantageously arranged in proximity to the cutoff edge, so that the collected water can be continuously sucked outwards during the operational rotation of the wheel hub. The important thing is that the first end piece forms both the cutoff edge and also in part the first collecting channel, thereby making optimal use of the suction effect.

The two end pieces each form an annular seal gap with the static bearing part or multiple static bearing parts. It is feasible, for example, for the first end piece to form a seal gap with a static outer ring, the seal gap of the second end piece being formed with a hollow cylindrical fastener of a sealing ring. It may well be advantageous to form the sealing gap with various static bearing parts or components of the seal arrangement. The crucial thing is that the drainage of the collecting channel by way of the sealing gap the suction effect described ensues due to the proximity of the cutoff edge, so that the water and the extraneous particles do not pass through the other sealing gap into the interior of the seal arrangement, but are transported outwards by the suction effect. For this to happen the minimum radial distance of the second end piece from the opposing stationary bearing part should be equal to or less than the radial distance of the first end piece from its stationary bearing part. The seal gap of the first end piece is advantageously further removed radially from the axis of rotation than is the seal gap of the second end piece.

Together, an inner face of the static bearing part and the outer face of the first end piece advantageously form an annular space, which, in longitudinal section towards the axis of rotation, has a wedge shape tapering towards the sealing gap of the first end piece.

In an advantageous embodiment the end pieces form a tapered segmental shape. This serves to give the collecting channel a radial depth, comparatively little material being needed for the end pieces.

In an advantageous embodiment the end pieces, in longitudinal section towards the axis of rotation, are arranged in a V-shape. This makes it possible to create a collecting channel having a large volume, which can be radially covered by the static bearing part or multiple static bearing parts. A splash water droplet, which has been caught in a collecting channel delimited in this way is both accelerated in a circumferential direction on one side and accelerated in the opposite circumferential direction on the radially opposite side. The splash water droplet thereby virtually rolls off in the collecting channel and is led in a circumferential direction by the latter owing to the shape-retaining surface tension. Effectively, a ring of water is thereby formed, from which the water can penetrate through one of the two sealing gaps only with difficulty. Only the water attracted by the suction effect can pass through the seal gap of the first end piece, so that the interior of the seal arrangement is effective by protected against an ingress of water and dirt particles.

In one advantageous embodiment an annular, axially open outer notch is formed on the centrifugal ring radially inside the cutoff edge. The outer notch causes the water, which is propelled outwards due to the centrifugal force and which runs radially outwards on the disk-shaped outer face of the centrifugal ring, at first turns partially axially towards the seal arrangement, before then being deflected outwards in the opposite axial direction. In this way it is possible, owing to the adhesion of the water to the outer face of the centrifugal ring, to direct larger proportions of water at least partially in an axial direction, thereby further boosting the suction effect.

In an advantageous embodiment the outer notch and/or the first end piece and/or the second end piece is/are formed from an elastic part. In principle it is possible to form the entire centrifugal ring, including the end pieces, from a metal, in particular a sheet metal. It is advantageous, however, if parts of the centrifugal ring, which in various exemplary embodiments assume a different shape, are formed from an elastic material, such as an elastomer, for example. This makes it possible to form the centrifugal ring from a fastener having a carrier and an elastic part to be fastened to the carrier. This elastic parts may then form either the outer notch, the first end piece and/or the second end piece.

The elastic part advantageously forms at least part of the disk-shaped outer face of the centrifugal ring. This allows the outer face to be formed on in such a way that an advantageous water flow occurs under centrifugal action, which assists the suction effect at the seal gap of the first end piece.

In one advantageous embodiment the elastic part, in proximity to the disk-shaped outer face, contains magnetic or magnetizable additives and forms a multipole encoder. The additives are materials suited for forming and maintaining a magnetic field. In this case it is feasible to achieve a mechanical pre-alignment of the added particles during molding. A coding can be subsequently introduced externally through magnetization, which is oriented in an alternating fashion in the circumferential direction, so that north and south poles occur alternately in the circumferential direction.

In one advantageous embodiment the elastic part forms a seal foot, which serves to form a static seal between the rotating bearing parts. The centrifugal ring rotates together with the rotatable bearing part, on which it is fastened. This seal foot, which constitutes a static seal in relation to the centrifugal ring and the rotatable bearing part (although both parts rotate), may be provided in order to prevent corrosion pitting occurring between the fastener of the centrifugal ring and the rotatable bearing part.

In one advantageous embodiment the seal arrangement according to the invention, besides the centrifugal ring, also comprises a sealing ring, the sealing ring likewise comprising sealing lips, which are also intended, however, to establish a frictional sealing contact together with the centrifugal ring. The sealing ring and the centrifugal ring advantageously form a cassette seal, which has a strong sealing effect and at the same time is easy to handle.

Further advantageous embodiments and preferred developments of the invention are set forth in the description of the figures and/or in the dependent claims.

The invention is described and explained in more detail below with reference to the exemplary embodiments represented in the figures.

In the figures:

FIG. 1 shows a seal arrangement in longitudinal section with a sealing ring and a centrifugal ring having a radially outer collecting channel and cutoff edge, FIG. 2 shows a seal arrangement in longitudinal section with the sealing ring from FIG. 1 and an offset centrifugal ring having a radially outer collecting channel and cutoff edge, FIG. 3 shows the seal arrangement from FIG. 1 when exposed to water.

EXEMPLARY EMBODIMENTS

Figure 1:
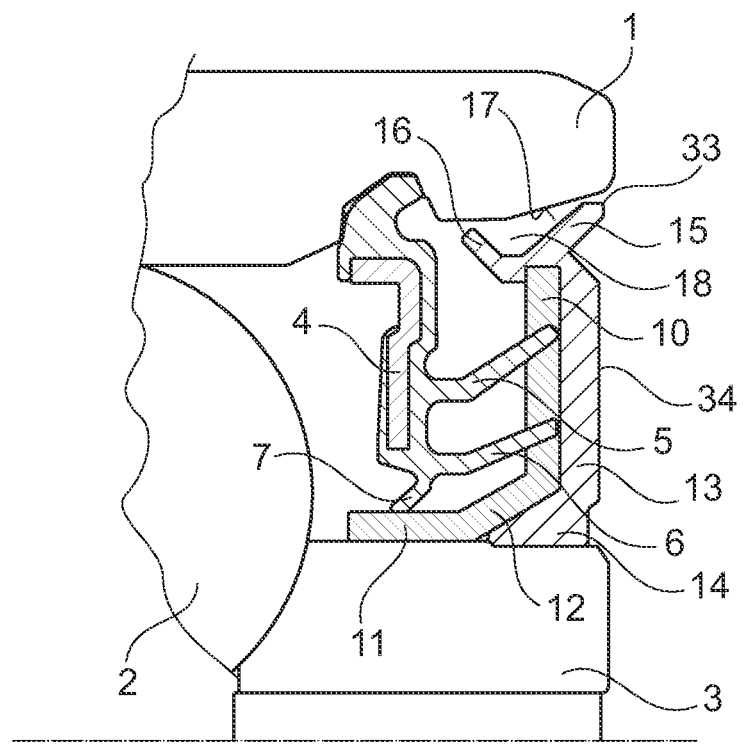
FIG. 1 shows a seal arrangement in longitudinal section with a sealing ring 4 and a centrifugal ring having a radially outer collecting channel 18 and cutoff edge 33.

The seal arrangement shown may be used in a double-row angular-contact ball bearing, for example, as are routinely used nowadays in motor vehicle applications. During installation, the sealing ring 4 is snapped axially into an inner groove of the outer ring 1. The centrifugal ring with its fastener 11, which is of hollow cylindrical shape, is then pressed onto the inner ring 3.

The radial part 10 and the fastener 11 of the centrifugal ring are advantageously connected to one another by a connecting part 12, which takes the form of a conical segment and holds the two annular parts together.

An elastic part integrally forms the two end pieces 15, 16, together with the seal foot 14 and the multipole encoder 13. In this way, various functions are concentrated on the elastic part, which may be an elastomer, for example, and may be designed according to the particular application, there being no need to modify the retaining part, which is formed from the radial part 10, the connecting part 12 and the fastener 11, for each product version.

Beneath the outer face 34 the elastic part has been enriched with a metal powder so that alternating magnetic poles could be formed in a circumferential direction. Radially outside the multipole encoder 13 is the outer notch 32, which is intended to support the cutoff edge 33 in that in the centering process all the water transported outwards first experiences an axial deflection in the direction of the seal arrangement before then being deflected again in the opposite axial direction, so that the splash water is impelled at a steep angle to the alignment of the seal gap between the outer ring 1, or the inner face 17, and the first end piece 15, over said seal gap. A partial vacuum, which sucks water and extraneous particles out of the collecting channel 18 and thereby out of the seal arrangement, is thereby produced at the orifice of the seal gap between the outer ring 1 and the first end piece 15.

The collecting channel 18 is formed in an arrangement, of V-shaped longitudinal section, of the first end piece 15 and the second end piece 16, the rotating collecting channel 18 being situated opposite a static bearing part, that is to say the outer ring 1, or rather the inner face 17 thereof. In longitudinal section to the axis of rotation the inner face 17 and the outer face of the first end piece 15 advantageously form a wedge shape, which tapers in the direction of the cutoff edge 33. This taper enhances the suction effect, which transports water and dirt particles outwards out of the collecting channel 18. It is evident from known sealing lip arrangements that water and dirt particles always accumulate in the vicinity of a sealing contact or seal gap on the side where the radial distance between the parts rotating relative to one another is at its smallest. It is also known that the angular position of the faces can contribute to this, in that a face more sharply incident to the radial is provided on the lubricant side than on the outside. This further enhances the transport effect out of the collecting channel 18.

The sealing ring advantageously carries a first axial sealing lip 5, a second axial sealing lip 6 and a radial sealing lip 7. These sealing lips may be omitted or provided as necessary, depending on whether the coefficient of friction or the sealing effect is of prime concern.

A further advantage accrues from the fact that the second end piece 16 also forms a seal gap with the outer ring 1, or else with the inner face 17, and thereby not only protects the interior of the seal arrangement but also radially encloses the sealing contact of the axial sealing lips 5, 6 and therefore prevents dirt particles getting into the frictionally sealed sealing contact of the axial sealing lips 5, 6.

It is perfectly possible to reduce the axial extent of the fastener 11, so that the tapered segmental connecting part 12 is axially widened and a larger area can therefore be covered by the seal foot 14. This affords more effective protection against corrosion pitting between the fastener 11 and the inner ring 3.

Figure 2:
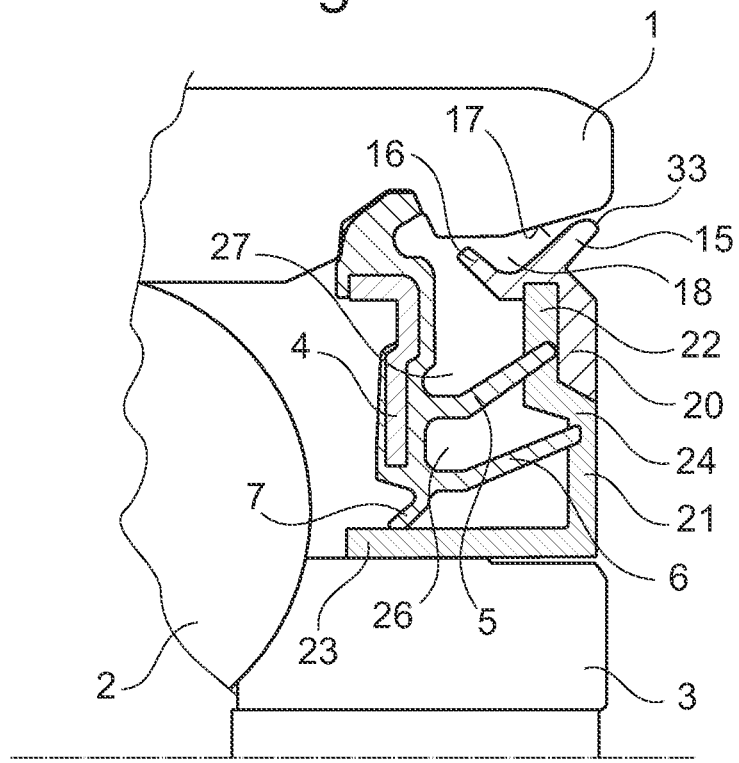

FIG. 2 shows a seal arrangement in longitudinal section with the sealing ring from FIG. 1 and an offset centrifugal ring with radially outer collecting channel 18 and cutoff edge 33.

The seal arrangement shown can be of shorter design in an axial direction, since the optional multipole encoder 20 has been shortened in its radial extent and is arranged on an offset connecting part 24, which connects the outer radial part 22 and the inner radial part 21 together. More space is therefore provided for the sealing lips.

Like the fastener 11 in FIG. 1 the fastener 23 is of hollow cylindrical design but extends up to the outer edge of the inner ring 3. It is thereby possible to provide more space for the axial sealing lip 6, so that this can be of longer or otherwise optimized design, so that the sealing effect lasts for longer or can be otherwise enhanced. In addition, the connecting part 24 protects the sealing contact of the axial sealing lip 6, so that this is protected very advantageously against increased material abrasion by extraneous particles.

The second collecting channel 27 furthermore serves to afford the sealing contact of the axial sealing lip 5 additional protection against abrasion, while the third collecting channel 26 affords the sealing contact of the axial sealing lip 6 additional protection against abrasion after abrasion of the axial sealing lip 5.

The seal arrangement shown can be shortened axially further by omitting the axial sealing lip 5 and moving the sealing ring 4 axially closer up to the centrifugal ring.

Reference is otherwise made to the exemplary embodiment in FIG. 1.

Figure 3:
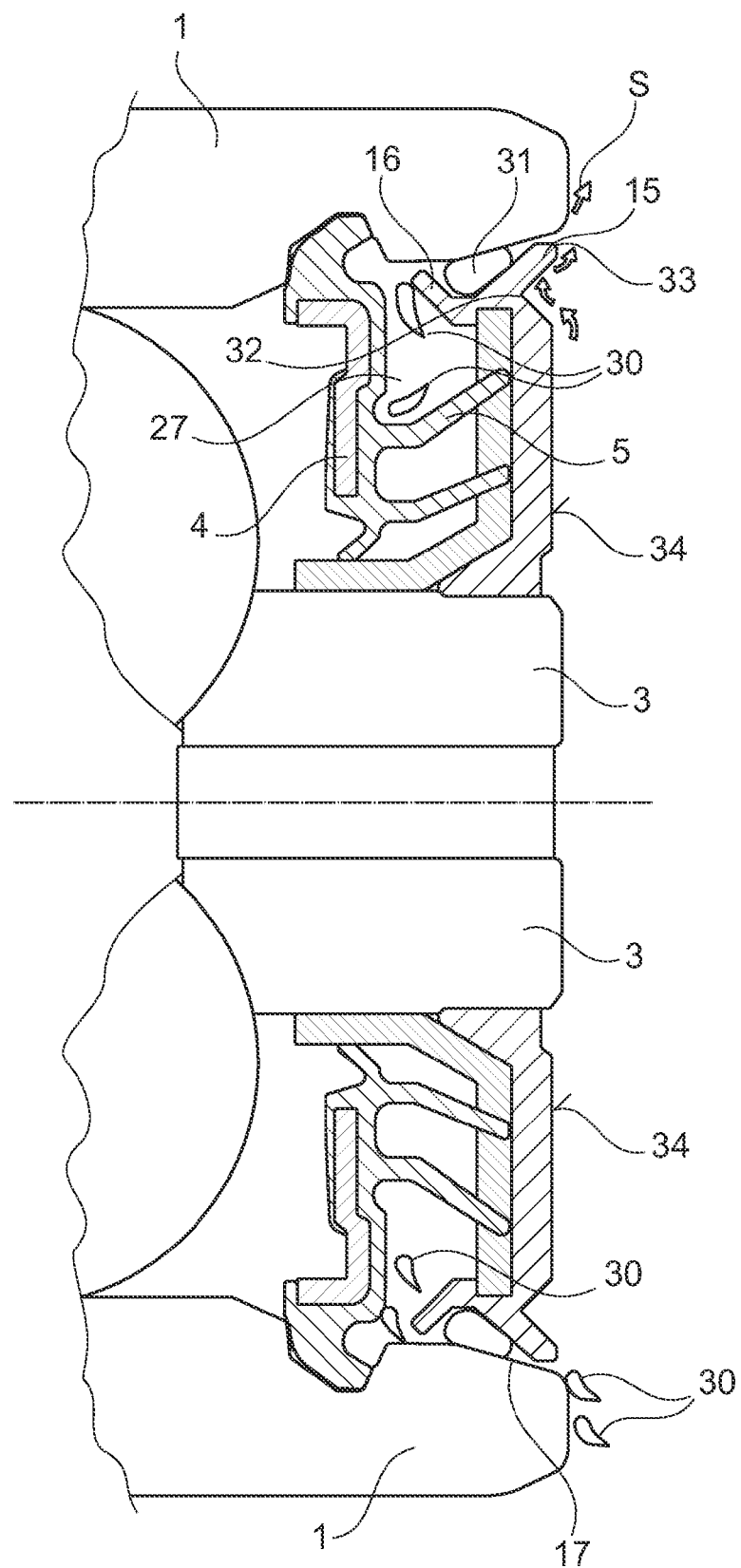

FIG. 3 shows the seal arrangement from FIG. 1 when exposed to water. The seal arrangement is shown in longitudinal section towards the axis of rotation at two diametrically opposing points of intersection, the diametric distance being shown in shortened form.

During operation of the rolling bearing water impelled radially outwards at the outer face is in part deflected axially according to the arrows shown inside the outer notch 32, thereby giving rise to the suction effect described at the orifice of the seal gap between the first rotating end piece 15 and the stationary outer ring 1.

Given a corresponding ingress of water, a ring of water 31 forms in the collecting channel 18 due to the inner and outer faces running relative to one another in a circumferential direction, and, owing to the surface tension, is scarcely capable of releasing water particles in an axial direction. The water therefore preferably moves towards the suction direction S, which is indicated by the bold arrow directly in front of the seal orifice and which is strong enough to detach the water from the ring of water 33.

Should a water droplet 30 nevertheless have gotten into the interior of the seal arrangement, this is caught by the collecting channel 27 and is led off in a circumferential direction, so that it can flow off diametrically opposite (downwards) under the force of gravity. The tapered segmental shape of the annular, second end piece 16 assists here in that the water 30 is led radially further downwards and emerges from the seal arrangement via the inner face 17 of the outer ring 1.

The ring of water 31 forming during operation advantageously functions as a dynamic sealing element, since the ring of water 31 comes into internal and external contact and compensates for the relative movement due to the eddy currents occurring inside the ring of water 31. As a result the ring of water 31 serves to seal the interior of the seal arrangement through a frictional contact of the ring of water 31 against the face 17 and the outer face of the first end piece 15.

The ring of water 31 furthermore holds the advantageous function of washing out dirt that has already collected inside the collecting channel 18 and by way of the suction effect described of transporting it back out of the seal arrangement and thereby disposing of it.

To sum up, the invention relates to a seal arrangement with centrifugal ring for the sealing between a rotatable bearing part and a static bearing part, the centrifugal ring comprising a first end piece, which forms both an outer circumference of the centrifugal ring and a cutoff edge located on a disk-shaped outer face. A solution is proposed which reduces the coefficient of friction without having to accept any loss of sealing effect, but in which the seal arrangement nevertheless remains cost-effective to manufacture. For this purpose the centrifugal ring comprises a second end piece, the end pieces together forming a first collecting channel in the vicinity of the cutoff edge and the end pieces each forming an annular seal gap with a static bearing part.

LIST OF REFERENCE NUMERALS

1 Static bearing part
2 Rolling element
3 Rotatable bearing part
4 Sealing ring
5 First axial sealing lip
6 Second axial sealing lip
7 Radial sealing lip
10 Radial part
11 Fastener
12 Connecting part
13 Multipole encoder
14 Seal foot
15 First end piece
16 Second end piece
17 Inner face
18 First collecting channel
20 Multipole encoder
21 Inner radial part
22 Outer radial part
23 Fastener
24 Connecting part
26 Third collecting channel
27 Second collecting channel
30 Fluid
31 Ring of water
32 Outer notch
33 Cutoff edge
34 Outer face
S Suction direction

The invention claimed is:

1. A centrifugal ring for a sealing between a rotatable bearing part and a static bearing part on an axial outside of a rolling bearing, the centrifugal ring comprising a fastener for fastening the centrifugal ring to the rotatable bearing part and a radial part extending from the fastener substantially in a radial direction away from an axis of rotation of the centrifugal ring, a disk-shaped outer face of the centrifugal ring being intended to form part of an outside of the rolling bearing and a first end piece of the centrifugal ring forming both an outer circumference of the centrifugal ring and a cutoff edge located on the disk-shaped outer face,
wherein the centrifugal ring comprises a second end piece, the first end piece and the second end piece together forming a first collecting channel and the first end piece and the second end piece each being intended to form an annular seal gap with the static bearing part or another static bearing part;
wherein at least one of the first end piece and the second end piece is formed from an elastic part that is a separate element from the radial part and the fastener.

2. The centrifugal ring according to claim 1, wherein the first end piece and the second end piece together form a tapered segmental shape.

3. The centrifugal ring according to claim 1, wherein the first end piece and the second end piece in longitudinal section towards the axis of rotation are arranged in a V-shape.

4. The centrifugal ring according to claim 1, wherein an annular, axially open outer notch is formed on the centrifugal ring radially inside the cutoff edge.

5. The centrifugal ring according to claim 1, wherein the first end piece has a larger outer radius than the second end piece.

6. The centrifugal ring according to claim 1, wherein the elastic part forms at least part of the disk-shaped outer face of the centrifugal ring.

7. The centrifugal ring according to claim 6, wherein the elastic part, in proximity to the disk-shaped outer face, contains magnetic or magnetizable additives and with these magnetic or magnetizable additives forms a multipole encoder.

8. The centrifugal ring according to claim 1, wherein the elastic part has a seal foot, which is intended to form a static seal with the rotating bearing part.

9. A seal arrangement comprising the centrifugal ring according to claim 1.

10. The centrifugal ring according to claim 1, wherein the fastener and the radial part are sections of a single piece element, and the elastic part is connected to the single piece element.

* * * * *